(12) United States Patent
Nicola

(10) Patent No.: US 7,521,030 B2
(45) Date of Patent: Apr. 21, 2009

(54) MATERIALS TREATMENT

(75) Inventor: Mazin Nicola, Worthing (GB)

(73) Assignee: Glaxo Group Limited (GB)

(*) Notice: Subject to any disclaimer, the term of this patent is extended or adjusted under 35 U.S.C. 154(b) by 468 days.

(21) Appl. No.: 11/293,399

(22) Filed: Dec. 5, 2005

(65) Prior Publication Data

US 2006/0081535 A1  Apr. 20, 2006

Related U.S. Application Data

(63) Continuation of application No. 10/394,016, filed on Mar. 24, 2003, now abandoned, which is a continuation of application No. 09/319,241, filed as application No. PCT/GB97/03280 on Dec. 8, 1997, now Pat. No. 6,572,831.

(30) Foreign Application Priority Data

| Dec. 6, 1996 | (GB) | ................................. 9625417.2 |
| Aug. 14, 1997 | (GB) | ................................. 9717121.9 |

(51) Int. Cl.
| B01D 50/00 | (2006.01) |
| B01D 11/04 | (2006.01) |
| B01D 11/00 | (2006.01) |
| B01D 61/00 | (2006.01) |
| B01D 35/18 | (2006.01) |
| B01D 37/00 | (2006.01) |
| B01J 10/00 | (2006.01) |

(52) U.S. Cl. ........................ 422/256; 422/180; 422/187; 422/188; 422/189; 422/168; 422/169; 422/170; 422/171; 422/900; 210/511; 210/648; 210/634; 210/774; 210/806

(58) Field of Classification Search ................. 422/180, 422/187–189, 168–171, 256, 900; 210/511, 210/648, 634, 774, 806, 51
See application file for complete search history.

(56) References Cited

U.S. PATENT DOCUMENTS

| 4,091,043 A | * | 5/1978 | Ohsaka et al. ........... 260/653.7 |
| 4,313,826 A | | 2/1982 | Gradl et al. .................. 210/114 |
| 4,662,948 A | | 5/1987 | Weitzman ................... 134/25.1 |
| 4,664,754 A | * | 5/1987 | Caputi et al. ................... 203/39 |
| 4,758,420 A | | 7/1988 | Knowles ..................... 423/659 |
| 5,009,787 A | * | 4/1991 | Broussard, Sr. ............. 210/634 |
| 5,271,842 A | * | 12/1993 | Degen et al. ................ 210/649 |
| 5,427,688 A | | 6/1995 | Sivavec ...................... 210/639 |
| 5,445,757 A | | 8/1995 | Pennetreau ................. 252/171 |
| 5,595,661 A | * | 1/1997 | Li et al. ...................... 210/634 |
| 5,674,451 A | * | 10/1997 | Nimitz et al. .................. 422/34 |
| 5,698,169 A | * | 12/1997 | Hawthorne et al. ............ 423/2 |
| 5,824,225 A | * | 10/1998 | Powell et al. ............... 210/656 |
| 5,968,368 A | * | 10/1999 | Powell et al. ............... 210/353 |
| 6,572,831 B1 | * | 6/2003 | Nicola ........................ 422/256 |

FOREIGN PATENT DOCUMENTS

| EP | 0 267 471 | 5/1988 |
| EP | 0 616 821 | 9/1994 |
| EP | 0 688 860 | 12/1995 |
| GB | 2 051 602 A | 1/1981 |
| GB | 2 143 744 A | 2/1985 |
| GB | 2 276 392 | 9/1994 |
| GB | 2 308 819 | 7/1997 |
| GB | 2 320 025 B | 7/2001 |
| GB | 2 355 006 B | 7/2001 |
| WO | 95/26794 | 10/1995 |

OTHER PUBLICATIONS

Patent Abstracts of Japan, vol. 011, No. 267, Aug. 28, 1987 & JP 62 067036A, Mar. 26, 1987.
Database WPI, Section Ch, Wk. 8730, Derwent Publications Ltd., London, GB.

* cited by examiner

Primary Examiner—Jill Warden
Assistant Examiner—Monzer R Chorbaji
(74) Attorney, Agent, or Firm—Rothwell, Figg, Ernst & Manbeck, P.C.

(57) ABSTRACT

A material contaminated with a solvent is treated with a hydrofluorocarbon to remove the contaminant. A preferred hydrofluorocarbon is tetrafluoroethane. Apparatus for carrying out the process is also described.

19 Claims, No Drawings

MATERIALS TREATMENT

CROSS-REFERENCE TO RELATED APPLICATIONS

The present application is a continuation of U.S. application Ser. No. 10/394,016, filed Mar. 24, 2003, which is a continuation of application Ser. No. 09/319,241, filed Jun. 7, 1999, which is a §371 of PCT/GB97/03280, filed on Dec. 8, 1997 designating the U.S.

This invention relations to materials treatment and particularly, although not exclusively, relates to a process for removing at least one material from a mass of material.

Many industries use so-called "organic solvents" (also known as "volatile solvents") during the manufacture of their products. For example, organic solvents such as toluene, methyl iso-butyl ketone, ethyl acetate, butyl alcohol and others are extensively used in the pharmaceuticals industry as reaction media and for selective solvent extraction of a single component from a mixture of components present as a solution or suspension in an aqueous medium.

Where a solvent is present as a reaction medium, it simply provides a medium in which the reaction can take place and is not consumed in the reaction. Generally, therefore, the solvent has to be removed at the end of the reaction. Such removal may be carried out by:

(i) Filtration—the solvent forms part of the permeate solution (or mother liquor) and the solvent-wet product is dried by heat and/or vacuum;
(ii) Evaporation—the solvent is removed from the final reaction mixture by distillation using heat and/or vacuum;
(iii) Extraction—the target component is removed from the reaction mixture by stirring with an immiscible solvent, normally water, followed by settling and subsequent physical separation of the two phases.

The aforementioned industrial processes generate large volumes of aqueous streams containing small levels of organic solvents, typically in the range of 0.05 to 2.0% v/v. These aqueous streams could be process streams comprising an aqueous phase or target compound and solvent as a contaminant. The contaminant could be detrimental to downstream process steps. Alternatively, aqueous effluent streams having had a target compound removed by solvent extraction may then be contaminated with solvent traces which have to be removed prior to discharge as effluent.

Another area where such solvents are extensively used is in the food industry. Here solvents such as hexane and dichloromethane have been used for many years in the manufacture of, for example, colouring and spice oleo-resins as flavouring substances.

It is important to reduce the solvent content from process streams and final products for economic, product efficacy, processing requirements, environmental and legislative reasons. Also in many cases the solvent contaminant is valuable and needs to be recovered for recycling.

Traditional methods for reducing concentrations of organic solvent contaminants from effluent, process streams and final products to acceptable levels involve solvent "stripping" using heat and/or vacuum. However, the use of these methods presents several commercial and technical problems. For example, they require high energy input, the cost of which will ultimately contribute to the unit cost of the final product and, especially in the case of generic pharmaceuticals manufacture, would inevitably affect competitiveness and profitability. Also, there are important environmental issues resulting from the inherent inefficiencies of this type of operation. In this regard, it is well known to those conversant in the art that the efficiency of recovery of organic solvents by conventional means, depending on volatility, can be as low as 75% with as much as 25% of the solvent present escaping to air, sea or land.

There are additional drawbacks specific to the manufacture of some pharmaceutical products where the target compound is a fragile fermentation metabolite. Many of these products are heat sensitive and often produce unwanted and even toxic degradation products. As a result, there may be a tendency to carry out the solvent stripping at a lower temperature and in a shorter time than is optimum to reduce solvent levels as required by legislation, with the danger of either product failing quality assurance tests or product leaving the factory with unacceptable levels of solvent contamination.

It is an object of the present invention to address the aforedescribed problems.

According to a first aspect of the present invention there is provided a process of removing a first material from a mass of material in which the first material is not naturally occurring, the process comprising:

(a) contacting the mass of material with solvent comprising a $C_1$-$C_4$ fluorinated hydrocarbon so as to charge the solvent with the first material; and
(b) separating charged solvent from the remainder of the mass of material.

Said first material is preferably a volatile contaminant.

Said first material may have a boiling point of greater than 25° C., suitably greater than 30° C., preferably greater than 35° C., more preferably greater than 40° C., especially greater than 50° C.

Said first material may have a boiling point of less than 300° C., suitably less than 250° C., preferably less than 200° C., more preferably less than 150° C., especially less than 100° C.

Said first material may have a melting point of greater than −200° C., suitably greater than −150° C., preferably greater than −125° C., more preferably greater than −100° C., especially greater than −80° C.

Said first material may have a melting point of less than 60° C., suitably less than 40° C., preferably less than 30° C., more preferably less than 15° C., especially less than 0° C.

Said first material is preferably a liquid at the temperature at which said material is contacted with said solvent. Said material may be contacted with said solvent at a temperature of less than 100° C., suitably less than 80° C., preferably less than 60° C., more preferably less than 40° C., especially at ambient temperature.

Said first material is preferably a solvent, more preferably an organic solvent. Suitable solvents include optionally substituted cyclic, aromatic or aliphatic hydrocarbons, alcohols, esters, ketones, ethers, nitrites and amines. Said solvent may be a halogenated, for example a chlorinated hydrocarbon such as tetrachloromethane, dichloromethane, perchloromethane or trichloromethane; an aliphatic hydrocarbon such as hexane; an ether such as diethylether or tetrahydrofuran; an ester, such as ethylacetate; an aromatic hydrocarbon such as benzene or toluene; an alcohol such as ethanol; a nitrite such as acetonitrile; a ketone such as methyl isobutylketone or di-isobutylketone.

Said first material is preferably brought into contact with other components in said mass of material in an upstream process step, for example as described in the introduction of this specification. For example, said first material may comprise a medium added to one or more other materials in order to facilitate a chemical or physical process. For example, said first material may be a reaction solvent or it may be a solvent used in the selective extraction of one material from a mass of material.

In one embodiment, the process may be used to remove a first material from a solid, for example, an inert solid matrix which may be polymeric, for example a polystyrene or polyacrylic polymer or a copolymer.

In this case, the first material may comprise relatively non-polar impurities for example, waxes, naphthalene, cyclic and linear ketones and the like.

The $C_1$-$C_4$ fluorinated hydrocarbon may be non-chlorinated. Preferably it comprises one or more carbon, fluorine and hydrogen atoms only. Preferably, said hydrofluorocarbon is a $C_1$ to $C_3$, more preferably, a $C_1$ to $C_2$ hydrofluorocarbon. Especially preferred is a $C_2$ hydrofluorocarbon.

Said hydrofluorocarbon may include up to 10, preferably up to 8, more preferably up to 6, especially up to 4, fluorine atoms. Preferably, said hydrofluorocarbon includes at least 2, more preferably at least 3, fluorine atoms.

Said hydrofluorocarbon is preferably aliphatic. It is preferably saturated.

Said hydrofluorocarbon may have a boiling point at atmospheric pressure of less than 20° C., preferably less than 10° C., more preferably less than 0° C., especially less than −10° C. The boiling point may be greater than −90° C., preferably greater than −70° C., more preferably greater than −50° C.

A preferred hydrofluorocarbon solvent is tetrafluoroethane with 1,1,1,2-tetrafluoroethane being especially preferred.

Said solvent used in the process may comprise a solvent mixture of a hydrofluorocarbon solvent as described and a co-solvent which may also be, but is preferably not, a hydrofluorocarbon of the type described herein. Said co-solvent is selected to affect the boiling point and/or dissolution properties of the solvent for the first material. The boiling point of said co-solvent may be less than 60° C., preferably less than 30° C., more preferably less than 15° C., especially less than 5° C. The boiling point of said co-solvent may be greater than −90° C., preferably greater than −70° C., more preferably greater than −50° C.

Said solvent used in the process may include one or more co-solvents of the type described.

Preferably, said solvent used in the process comprises a major portion of said hydrofluorocarbon and a minor portion of said co-solvent. Preferably, at least 90 wt %, more preferably at least 93 et %, especially at least 97 wt % of said solvent is comprised by said hydrofluorocarbon. The balance is preferably made up of one or more co-solvents as described.

Said co-solvent may be selected from hydrocarbons and ethers. Preferred hydrocarbons have up to six carbon atoms. They may be alicyclic or, preferably, aliphatic. They are preferably alkanes with methane, ethane, propane and butane being preferred. Preferred ethers are dialkylethers, for example, $C_1$ to $C_4$ dialkyl ethers, with dimethyl ether being especially preferred.

Preferably, said solvent does not include a co-solvent. However, if it does, it is preferably present in a concentration which approximates to that of an azeotrope with the solvent so that frequent and regular distillation will not result in a change in the composition of the mixture.

Preferably, the solvent contacted with said material has a lower boiling point than said first material.

Preferably, in the method said first material and said solvent are intimately mixed prior to step (b).

Preferably, the solvent is removed from the charged solvent and hence from the first material by distillation. Said distillation may take place under low vacuum.

The method preferably includes the step of removing said solvent from the remainder of said mass of material, after step (b). Removal of said solvent may be achieved by providing conditions for the evaporation of said solvent. For example, the temperature may be raised, suitably by less than 50° C., preferably less than 40° C., more preferably less than 30° C., and/or the pressure may be reduced to less than ambient pressure.

According to a second aspect of the present invention there is provided apparatus for use in a process according to said first aspect, the apparatus comprising a separation means, for example a column, having a first inlet via which solvent may be input into the separation means and a second inlet via which a mass of material which includes a first material to be removed from the mass of material may be input into the separation means, the first and second inlets and/or said separation means being arranged for the intimate contact of said solvent passing into the separation means via said first inlet and said mass of material passing into the separation means via said second inlet, the apparatus further comprising:

means for delivering solvent to the first inlet of the separation means;

means for delivering the mass of material which includes the first material to the second inlet of the separation means;

means for collecting solvent which includes the first material extracted from the mass of material; and means for collecting the mass of material after the first material has been extracted therefrom.

Valve means is preferably provided between said means for delivering solvent and said first inlet.

Valve means is preferably provided between said means for delivering the mass of material and said second inlet.

Valve means is preferably provided in a conduit means which is connected to said separation means for downstream passage of fluid, for example towards said means for collecting solvent which includes the first material extracted from the mass of material.

Additionally, valve means is preferably provided in a conduit means which is connected to said separation means or downstream passage of fluid, for example towards said means for collecting the mass of material as aforesaid.

Said aforementioned valve means are preferably one-way valves.

Preferably, means is provided for removing solvent from the first material after a mixture comprising the solvent and first material has been collected by said means for collecting.

Re-circulation means is preferably provided for recirculating solvent back to said means for delivering solvent to the first inlet of the separation means after the solvent has been removed from the first material.

Re-circulation means is preferably provided for re-circulating solvent back to said means for deliverying solvent to the first inlet after the solvent has been removed from the mass of material collected after the first material has been extracted therefrom.

Pressure reduction means is preferably provided for reducing, the pressure in the apparatus, especially in the separation means to less than atmospheric pressure. The apparatus is suitably arranged to enable solvent contacted with the mass of material to be liquified so that liquid solvent is contacted with the mass in the separation means.

According to a third aspect of the invention, there is provided a product of a process according to said first aspect.

Specific embodiments of the invention will now be described, by way of example, with reference to the accompanying figure which is a schematic diagram of apparatus for removal of contaminants from process streams.

Referring to the figure, the apparatus comprises an extraction column 2 having a mixing zone 4 provided with a mechanical stirrer or other means to aid mixing for example packing material such as knitted wire gauze; loose fill material made of glass or steel such as rings, helices, spirals, mesh rings with cross-pieces, double wound wire spirals or rings; Propack protruded packing; or structured packing such as Sulzer type (or the like).

A pipeline 6 extends between the top of column 2 and a solvent storage vessel 8. A pipeline 10 extends between a first recovery vessel 12 and pipeline 6 to communicate with pipeline 6 at a position between control valves 14, 16 provided in pipeline 6. A heat exchanger 18, compressor 20 and vacuum producing means 22 are provided in pipeline 10. Vessel 12 includes a run-off valve 13.

A contaminant supply vessel 24 (or other supply means) is connected via pipeline 26, which includes a control valve 28, to a lower end of the column 2. The upper end of the column 2 is connected via pipeline 30 which includes a control valve 32, to a second recovery vessel 34. At a lower end, the second recovery vessel 34 includes a run-off valve 36. At its upper end it includes a pipeline 38 which communicates with pipeline 10.

A pipeline 40 which includes control valves 42, 44, 46 and a sight glass 48 is connected between the lower end of column 2 and an upper end of the first recovery vessel 12.

The first and second recovery vessels 12, 34 are both jacketed and provided with stirrers 50 and heaters (not shown).

In general terms, the apparatus may be used as follows:

A liquid process stream containing one or more contaminants and representing a "light" phase may be fed from vessel 24 via pipeline 26 (or may otherwise be fed directly) into the lower end of column 2. A liquid "heavy" phase comprising an extraction solvent may be fed, under sufficient pressure to maintain the solvent in a liquid state, from vessel 8 into the upper end of column 2. Intimate mixing of the light and heavy phases occurs in the mixing zone 4 as the phases flow countercurrent to one another and, as a result, transfer of contaminant occurs from the light phase to the heavy phase and, accordingly, the heavy phase becomes charged with contaminant.

The contaminant depleted light phase then flows to vessel 34 from which any extraction solvent present may be evaporated via pipeline 38, using compressor 20 and heat exchanger 18, followed by return of the solvent to vessel 8. The remainder of the light phase may be run off using valve 36.

The contaminant rich heavy phase flows from the bottom of the column 2 to first recovery vessel 12 from which the extraction solvent may be evaporated and returned to vessel 8.

It should be noted that mixing and separation of the light and heavy phases occurs continuously with continuous recycling of the extraction solvent and the various fluid flows are under the control of flow control valves and flow monitoring valves. Additionally, the temperature within each part of the apparatus may be controlled by heating and/or cooling elements and/or jackets.

Substantially, the whole of the apparatus described is made of stainless steel.

The following examples 1 to 8 illustrate how the apparatus can be used to extract contaminants.

In the examples, analysis was by Gas Chromatography as follows:

Column: 5% Carbowax on Porasil C100-200 mesh, 2 m, 2 mm.
Oven: 100° C.
Detector: Type FID, Hydrogen 30 ml/min, Air 250 ml/min, 250° C.
Carrier: Nitrogen, 39.0 ml/min
Calculation: External standard method

EXAMPLE 1

In this example, the extraction column 2 was packed with a combination of knitted wire gauze and glass raschig rings.

5 liters of a "contaminated" solution, containing isobutyl-methyl ketone (MIBK) (68 ml) in water was prepared in vessel 24. The apparatus was evacuated to 8 mbar pressure. Then, 1,1,1,2-tetrafluorethane (TFE) (5 kg total) was charged to storage vessel 8 and column 2 at 5 bar pressure and then continuously recycled using compressor 20 by pumping from the top of vessel 8, through the top of the extraction column 2, out of the bottom of the extraction column and back to the vessel 8. A flow rate of liquid TFE of 10 liters/hour was maintained.

The contaminated solution was introduced to the bottom of the column 2 via valve 28 using a flow pump (not shown) at a constant rate of about 165 ml/min.

Treated contaminated solution was directed from the top of the column 2 to the second recovery vessel 34 where any TFE present was evaporated and returned to vessel 8 using the compressor 20.

When all the contaminated solution has been used, any liquid TFE remaining in the column 2 was drained into the first recovery vessel 12 via the sight glass 48 and the TFE flow was redirected to the vessel 8 via heat exchanger 18. Pumping of the TFE into the vessel 8 was continued until a negative pressure was observed in vessel 12. Treated aqueous solution was collected from vessel 12 via valve 13, measured and sampled. Results are provided below.

Results
Initial volume of contaminated aqueous solution=5.0 liters.
Initial MIBK content=1.35% v/v.
Final volume of aqueous solution=5.0 liters.
MIBK content in final aqueous solution=0.27% v/v.

EXAMPLE 2

In this example, the packing material in the extraction column 2 was modified to improve mixing efficiency. It comprised [*Query—how was it modified?]

A "contaminated" solution was prepared containing water (4800 ml) and MIBK (72 ml) and treated with tetrafluoroethane as in Example 1. The same flow rates were used. Temperature in the extraction column and the evaporator were maintained at around 15° C. throughout the experiment.

Results
Initial volume aqueous solution=4872 ml
Initial MIBK content=1.5% v/v
Final aqueous volume=4870 ml
Final MIBK content=0.09% v/v

EXAMPLE 3

A "contaminated" solution of MIBK (75 ml) in water (5.0 l) was prepared and treated as example 2. The contaminated solution flow rate was maintained at 250 ml/min. (It was believed that a higher flow rate would induce more turbulence within the extraction column, thus improve mixing).

Results
Initial aqueous volume =5075 ml
Initial MIBK content=1.47% v/v
Final aqueous volume=5050 ml
Final MIBK content=0.06% v/v

EXAMPLE 4

This experiment was carried out to investigate the effect of a higher aqueous flow rate on extraction efficiency. A "contaminated" solution of MIBK in water was prepared and treated as above [*Query—is the same strength solution as in eg 3 or eg 2 used]. The aqueous stream flow rate was maintained at 300 ml/min throughout the experiment.

Results
Initial aqueous volume=3045 ml
Initial MIBK content=1.5% v/v
Final aqueous volume=3035 ml
Final MIBK content=0.21% v/v

EXAMPLE 5

A solution containing ethyl acetate (60 ml) in water (3.0 l) was prepared and treated as in the above examples.

TFE (2.5 kg) was charged into the apparatus and recycled as above at a flow rate of 0.10 l/hour and 5 bar pressure to maintain the liquid state. The aqueous ethyl acetate solution was introduced at a flow rate of 180 ml/min. Temperatures within the extraction column and the two vessels were maintained at 15° C. through the experiment.

Results
Initial aqueous volume=3060 ml
Initial ethyl acetate content=2.0% v/v
Final aqueous volume=3030 ml
Final ethyl acetate content=0.20% v/v

EXAMPLE 6

A solution containing acetone (60 ml) and water (3.0 l) was prepared and treated as above. A total of 3.5 kg 1,1,1,2, TFE was charged into the apparatus and recycled at a flow rate of 10.0 l/hour. The acetone/water solution was pumped through at a flow rate of 140 ml/min. All temperatures were maintained at 15° C.

Results
Initial aqueous solution volume=3060 ml
Initial acetone content=2.0% v/v
Final aqueous volume=27.60 ml
Final acetone content=0.01% v/v

EXAMPLE 7

A solution containing tetrahydrofuran (THF) (120 ml) in water (3.0 l) was prepared and treated as in the above examples. A total of 3.0 Kg TFE was charged into the apparatus and recycled at a flow rate of 10 l/hour. The THF solution was pumped through at a flow rate of 140 ml/min. All temperatures were maintained at 15° C.

Results
Initial volume of THF solution=3120 ml
Initial THF content=3.85% v/v

No analytical results are available. However, the treated aqueous stream had negligible odour of THF.

EXAMPLE 8

An aqueous solution containing iso-propyl alcohol (IPA) (200 ml) was prepared and treated using the same conditions as Example 7.

Results
Initial aqueous solution volume=2200 l
IPA content of initial solution=9.1% v/v
Final aqueous solution volume=2175 ml
Final IPA content=0.11% v/v

EXAMPLE 9

50 g of powdered Amoxycillin contaminated with 0.25% w/w dichloromethane was loosely packed into a glass column of dimensions: 25 mm internal diameter and 200 mm length. The column was evacuated and liquified TFE was allowed to flow through it directing the flow out of the column into a sealed vessel. The TFE collected in the vessel was continuously evaporated and recycled through the column with the aid of a compressor. Flow rate of the liquified gas through the column was judged at about 50 ml/minute and the extraction was carried out for a total of 10 minutes. The TFE was then evacuated from the apparatus. Gas chromatography analysis on the Amoxycillin after treatment showed dichloromethane levels of below 0.1% w/w.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiments). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A process of removing a first solvent from a mass of powdered amoxycillin in which the first solvent is not naturally occurring, the process comprising:
    (a) contacting the mass of powdered amoxycillin with second solvent comprising a $C_1$-$C_4$, fluorinated hydrocarbon so as to charge the second solvent with the first solvent; and
    (b) separating charged second solvent from the remainder of the mass of powdered amoxycillin.

2. A process according to claim 1, wherein said first solvent is a volatile contaminant.

3. A process according to claim 1, wherein said first solvent has a boiling point of greater than 25° C. and less than 300° C.

4. A process according to claim 1, wherein said first solvent is a liquid under the conditions at which said material is contacted with said second solvent.

5. A process according to claim 1, wherein said first solvent is an organic solvent.

6. A process according to claim 5, wherein said second solvent is a chlorinated solvent.

7. A process according to claim 6, wherein said second solvent is tetrachloromethane, perchloromethane, or trichloromethane.

8. A process according to claim 6, wherein said second solvent is dichloromethane.

9. A process according to claim 1, wherein said first solvent is selected from an optionally substituted cyclic, aromatic or aliphatic hydrocarbon, an alcohol, ester, ketone, ether, nitrile or amine.

10. A process according to claim 1, wherein said first solvent is brought into contact with other components in said mass of powdered amoxicillin in an upstream process step.

11. A process according to claim 1, wherein the $C_1$-$C_4$ fluorinated hydrocarbon is non-chlorinated.

12. A process according to claim 1, wherein said hydrofluorocarbon is aliphatic.

13. A process according to claim 1, wherein said hydrofluorocarbon has a boiling point at atmospheric pressure of less than 20° C.

14. A process according to claim 1, wherein said hydrofluorocarbon has a boiling point at atmospheric pressure of greater than −90° C.

15. A process according to claim 1, wherein said hydrofluorocarbon is tetrafluoroethane.

16. A process according to claim 1, wherein said second solvent used in the process comprises a solvent mixture of a hydrofluorocarbon solvent and a co-solvent.

17. A process according to claim 1, wherein the hydrofluorocarbon is removed from the charged solvent and hence from the first solvent by distillation.

18. A process according to claim 1, including the step of removing said second solvent from the remainder of said mass of powdered amoxicillin after step (b).

19. A process according to claim 18, wherein removal of said second solvent is achieved by providing conditions for the evaporation of said second solvent.

* * * * *